United States Patent [19]

Richardson

[11] 4,031,731

[45] June 28, 1977

[54] ALERT MEANS FOR A PROGRAMMING SYSTEM FOR PRESS BRAKES OR THE LIKE

[75] Inventor: Rolland A. Richardson, Alameda, Calif.

[73] Assignee: Canron, Inc., Oakland, Calif.

[22] Filed: Mar. 26, 1973

[21] Appl. No.: 344,870

[52] U.S. Cl. .................................. 72/37; 72/7; 72/31
[51] Int. Cl.² .......................................... B21D 5/02
[58] Field of Search ................ 72/7, 10, 12, 31, 37, 72/DIG. 22; 83/71, 72, 73, 522; 271/57; 226/100, 9, 15; 100/99

[56] References Cited

UNITED STATES PATENTS

| | | | |
|---|---|---|---|
| 2,382,745 | 8/1945 | Powers | 72/36 |
| 2,838,963 | 6/1958 | Good et al. | 72/DIG. 22 |
| 3,156,287 | 11/1964 | Munro | 72/8 |
| 3,348,440 | 10/1967 | Jensen | 83/71 |
| 3,600,993 | 8/1971 | Williams | 83/71 |
| 3,618,349 | 11/1971 | Roch | 72/8 |
| 3,653,058 | 3/1972 | Sundberg | 83/522 |

Primary Examiner—Lowell A. Larson

[57] ABSTRACT

In a programming system for press brakes or the like where a number of bending operations are performed on a piece of work, in the course of which the work, must be turned or flipped over, means are provided for alerting an operator as to the necessity for turning or flipping of the work in preparation for the coming bending operation.

7 Claims, 4 Drawing Figures

ALERT MEANS FOR A PROGRAMMING SYSTEM FOR PRESS BRAKES OR THE LIKE

My invention relates to the operation of press brakes or the like, and more particularly to the programming of a sequence of operations to be performed by such a machine.

Machines such as press brakes are employed in the bending of sheet metal to various forms. Each different form will require a different sequence of operations involving different positions of bends, different angles of bends, different directions of bends and probably a different total number of bends. To perform such operations in a press brake, they must follow in a certain sequence to bring about a particular form.

Systems for programming a press brake or like machine are known. Such systems provide for presetting the machine to enable it to perform the necessary bending operations, and then sequencing such operations of the machine so that they will occur in proper order. Such systems are disclosed in U.S. Pat. to Roch No. 3,618,349 of Nov. 9, 1971 for GAUGING SYSTEM FOR PRESSES, and in the pending application of the present applicant for PROGRAMMING SYSTEM FOR PRESS BRAKES OR THE LIKE, Ser. No. 283,857, filed Aug. 25, 1972 now U.S. Pat. No. 3,824,822.

After the first bending operation in a machine controlled by such a system, the machine, automatically, is adjusted for the next operation in the sequence. The operator places the work in the machine and the machine is triggered for such operation, and then automatically conditioned for the next operation to be performed in the sequence. The operator then places the partially formed piece in the machine for the third operation and the machine is again triggered to perform this operation. Succeeding operations are carried out unitl the sequence is completed, and the machine is then ready to start the sequence again on a fresh blank.

Many of such operations necessitate that the operator rotate the work or flip the work before placing it back into the machine to carry out the next operation in the sequence. Should the operator forget to turn or flip the work when necessary, the work will be ruined.

Among the objects of the present invention are;

1. To provide a novel and improved alert means for use in a system for programming a sequence of operations by a press brake or the like, to alert an operator as to the necessity for turning or flipping the work in preparation for the next operation in the sequence.

Additional objects of the present invention will be brought out in the following description of a preferred embodiment of the same, taken in conjunction with the accompanying drawings wherein:

FIG. 1 is a circuit diagram of my novel and improved alert means.

FIG. 2, for purposes of illustration, depicts the control of such circuit from the sequence component of a programming system, in the present instance, a stepper drum constituting a sequence component in a prgramming system, such as disclosed by me in my aforementioned pending application.

Figure 1:
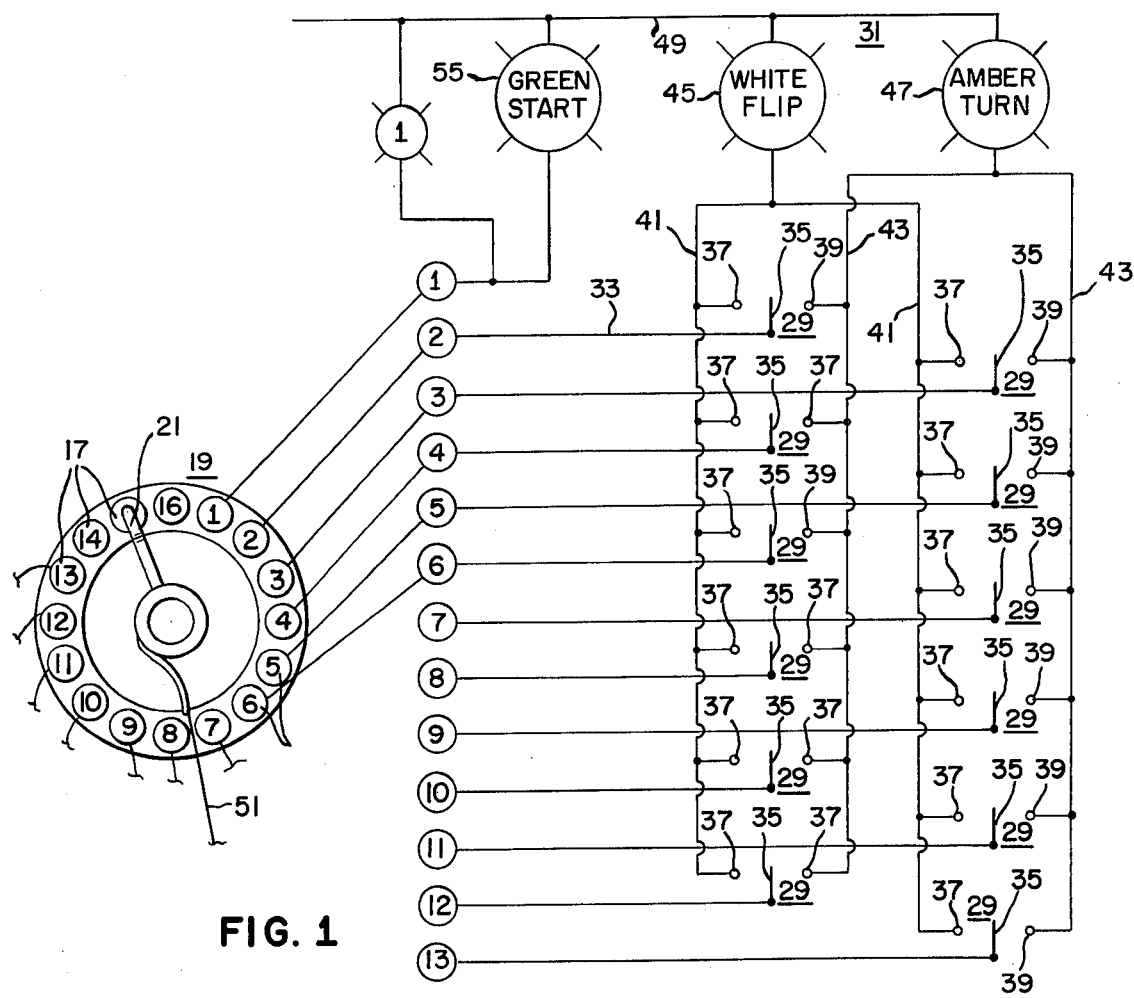
Figure 2:
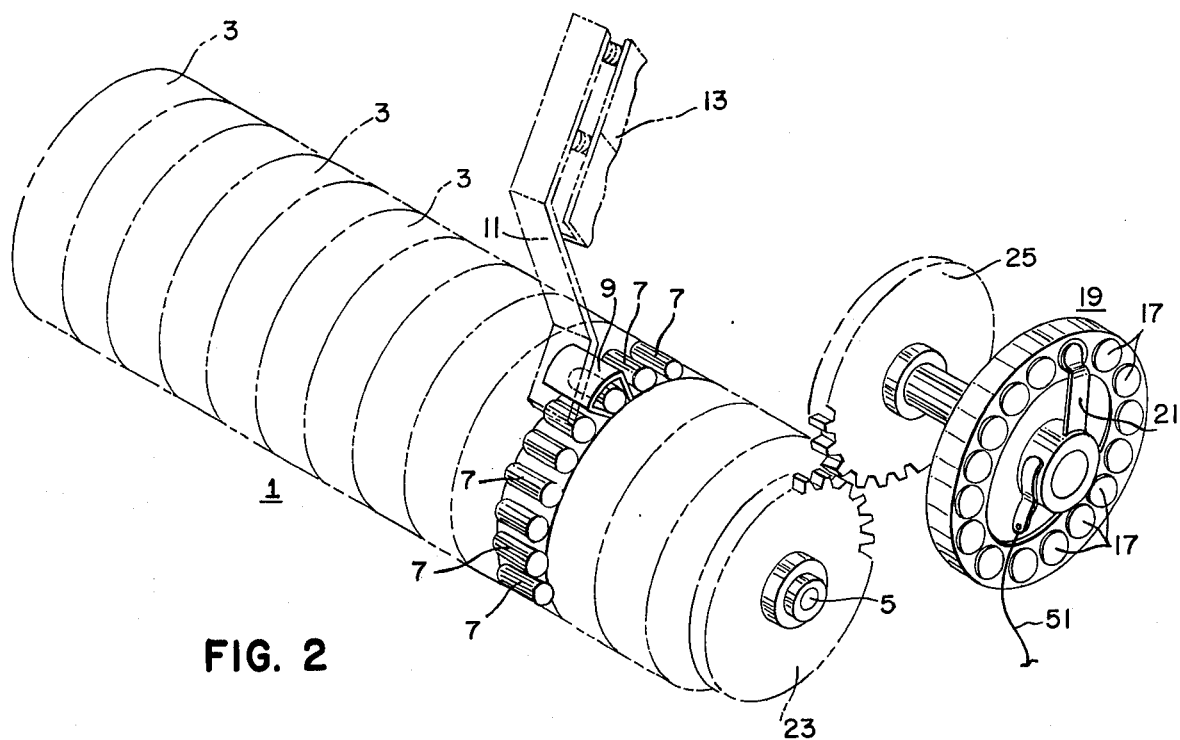
Figure 3:
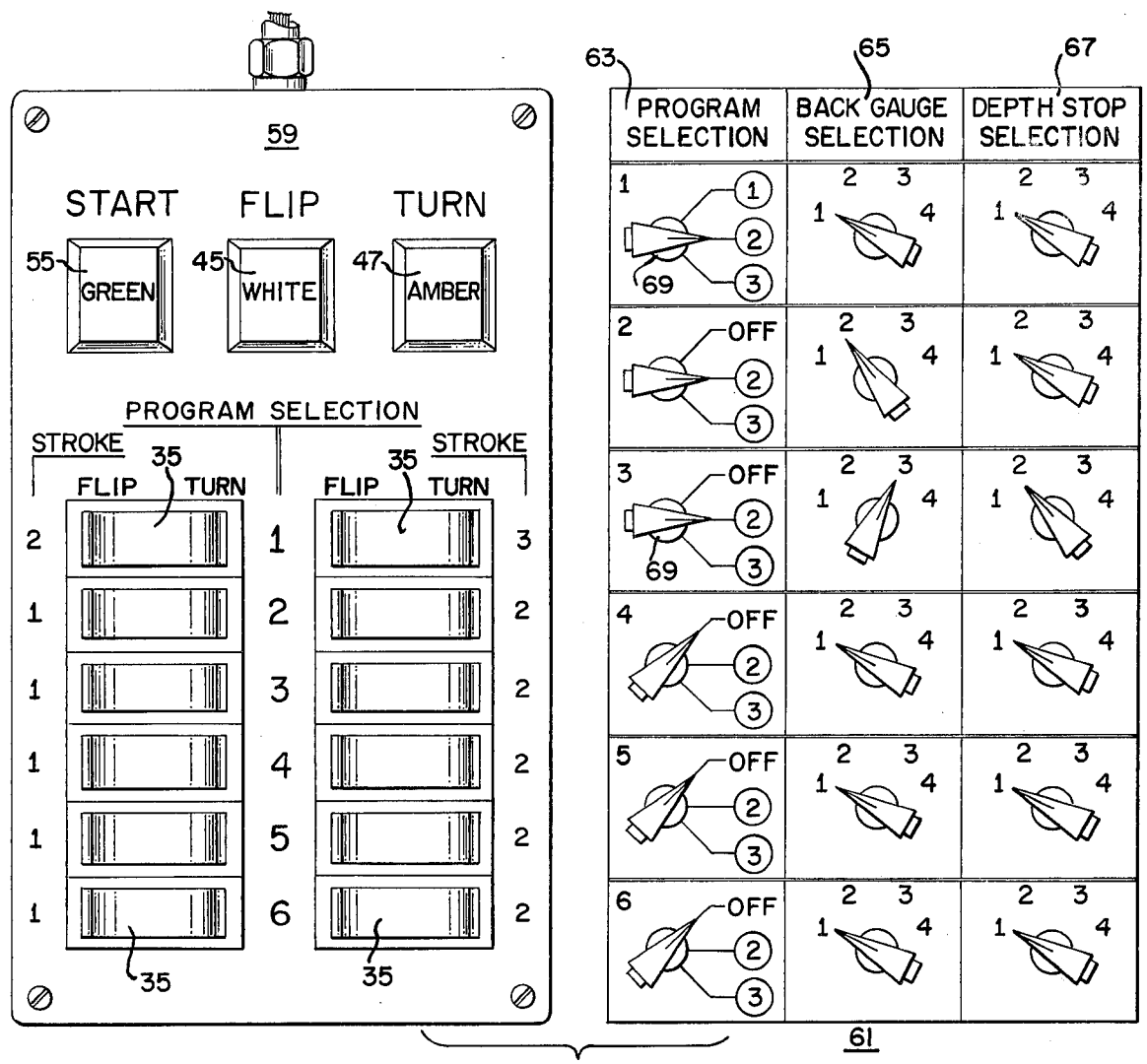
FIG. 3, is a view of an indicating panel constituting an important feature of my novel and improved alert means and showing it in relationship to a sequence control panel of a programming system as depicted in my aforementioned application.
Figure 4:
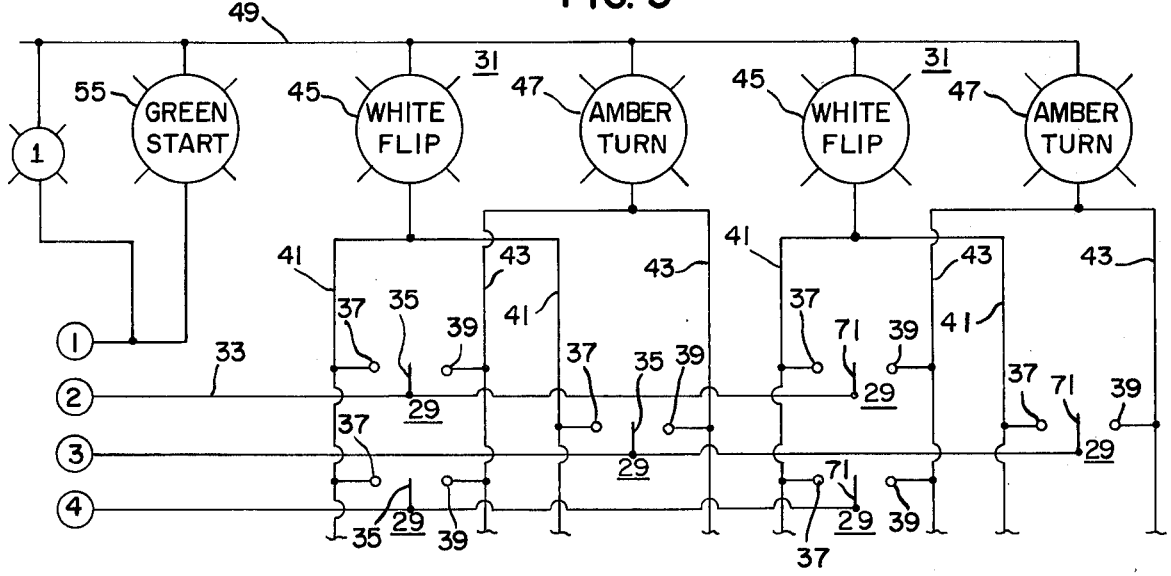
FIG. 4, is a view depicting a modification of the circuit diagram of FIG. 1.

Referring to the drawings for details of my invention in its preferred form, the alert means, as previously indicated, has been illustrated in association with a stepper drum 1, which, in response to energization of an associated winding, (not shown) is caused to open or close a series of contact switches. As such, this apparatus may be deemed to symbolically represent a programming system for controlling a sequence of operations of a press brake or the like, though different programming systems may utilize different but corresponding apparatus for such purpose. The showing of a stepper drum, therefore, is merely illustrative of one form of sequence determining apparatus with which the present invention may be combined.

The stepper drum illustrated, comprises a plurality of drum cams 3 keyed to a common shaft 5, each drum cam involving a plurality of peripheral projections 7 on any or each of which, may be selectively installed, a cam segment 9.

Associated with each of these cams, is a cam follower 11 and switch assembly 13 controlled thereby, the switch assembly involving normally closed contacts which open in respond to the cam follower riding the added cam segment or segments. Such stepper drum and associated cam follower and switch assemblies, represent any programming system having this or corresponding apparatus for sequentially opening and closing a plurality of circuits adapted to sequentially control operations of a press brake or the like, the first cam usually conditioning the machine for the first operation in the sequence.

Associated with and operating from the stepper drum are a series of stationary contacts 17 corresponding in number to the number of stepper drum cams utilized in the programming system, such contacts being elements of a rotary switch 19, they being sequentially contacted by a movable contactor 21 in accordance with utilization of the corresponding cams of the stepper drum in the programming system. Thus, for example, if cam number four of the stepper drum were being utilized then the movable contact will be engaging stationary contact number four in the series.

Such correspondence is brought about by causing the rotary movement of the contactor arm to be correlated to the rotational movement of the stepper drum, by a gear 23 mounted on the shaft of the stepper drum and meshing with a corresponding gear 25 on the shaft of the rotary contactor in a one-to-one ratio drive coupling.

The making of contact between the rotary contactor and any one of the contacts associated therewith, functions to close a circuit 29 to selective indicating means 31 to alert an operator as to whether the next operation of the press brake, as determined by the acting cam of the stepper drum, will necessitate a reversal or a flipping of the work before placing it into the machine.

Such a circuit involves a line 33 from the particular contact to the center terminal of a rocker type switch 35 which may be tilted from a horizontal open position, to the left to engage a contact 37 or to the right to engage a different contact 39. Such switch may, therefore, in its horizonta position, represent an open circuit or may be made to close one or the other or two branch circuits 41 or 43, one including a light 45 of one color such as white, the other a light 47 of another color such as amber, with a common return line 49 to a source of power, the other side of which will be connected to the rotary contactor by a common line 51, to complete the circuits through these lights. One of the lights may indicate the necessity for rotating the work before placing it back in the machine and such notation may be associated with that light, while the other light may indicate the necessity for flipping the work before carrying on the next operation, and a corresponding notation may be associated with this light. With the switch in its neutral or open circuit position, neither light will be energized, thus calling for a feeding of the work into the machine without necessitating any prior rotational or flipping of the work before inserting it into the machine.

The first cam representing the condition of the machine following the completion of a sequence and ready to start another, the first contact may be included in a circuit through a green light 55, to indicate the machine to be ready for a sequence.

The lights and switches may be mounted on a small portable alert panel 59 which may be hung on the ram of the machine, or at some other point conveniently within view of the operator.

The switches will be preset in accordance with the necessity for rotating or flipping of the work at certain stages in sequence of operations to be performed by the machine. Thereafter, at appropriate times in the sequence of operations, the lights will come on to alert the operator as to the necessity of rotating or flipping of the work in preparation for the next operation of the machine.

The alert panel illustrated is applicable to a programming system as depicted by me in my aforementioned pending application, and for purposes of relating this panel to such programming system, there is depicted alongside this panel, a representative control panel 61 employable in such system.

Such control panel would involve three switch banks 63, 65, 67, the first for program selection, the second for back gauge selection, and the third for depth gauge selection.

The first bank involves a number of three position switches 69. Except for the first switch, only the last two contacts of each of the remaining switches, are employed for program selection to accommodate the system to situations, where, if two successive bending operations call for the same back gauge setting, the particular switch involved can be set to its last contact and the machine will hold the pertinent back gauge adjustment for two successive bending strokes. If only one stroke is involved for a selected back gauge setting, then the appropriate switch will be set at its middle contact.

Since the first switch in the program selection switch column will be used more often than the others, its three contacts may be utilized to provide for using a back gauge setting once, twice or three times in succession to perform a corresponding number of bending operations.

The unused first contact of the other switches in this column can then be utilized in circuitry which enables cutting out that sequence from the program selection.

The second bank of switches, each provide for selection of one of four circuits, each determining a different back gauge setting, whereby for a particular program selection, as represented by one of the program selection switches in the first column, the corresponding switch in the second column will determine the back gauge setting to be used.

In the third column are switches similar to those in the second column, each selectively controlling one of four circuits which determine selection of one of four depth stop adjustments to be used in conjunction with the corresponding switches in the first two columns.

In the alert panel 59, are pairs of switches 35 corresponding in number to the number of single switches 69 in the program selection column of the control panel. These pair of switches 35 have been designated in sequence according to the corresponding single switches 69 of the control panel that is, for each single switch 69, there is a corresponding pair of switches 35.

The left hand switches 35 have a number alongside, corresponding to the second stroke associated with the first switch 69 and the first stroke associated with the remaining of the switches 69, whereas the right hand switches correspond to the third stroke associated with the first switch 69 and the second stroke associated with each of said remaining switches 69.

Thus, if the first stroke under control of the third switch 69 for example in the program selection column of the control panel 61 requires a flipping of the work before inserting the work into the machine, the left hand switch 35 of the pair identified under program selection 3 will be depressed at its left end to indicate "flip". Thereafter, when the machine sequence reaches the stage where the third switch 69 of the control panel takes over, the white light 45 will light as the machine is readied to perform the first stroke under control of this switch. The operator, being thus alerted, will flip the work before placing it back into the machine.

If a turn of the work is required instead of a flip, then the right end of the switch in question will be depressed, in lieu of the left end, whereupon the amber light 47 will light at the appropriate time in the sequence.

Should the light be desired on a second stroke under control of the third switch 69 for example, then the right hand switch 35 will be depressed. Which end of this switch will be depressed will depend upon whether a flip or a turn of the work is called for.

The alert panel will obviously have to be modified to conform to the scope and character of the programming system and the control panel, with which it is to be used.

Frequently, in the carrying out of a sequence of operations on a piece of work, it may become necessary to both rotate and flip the work in preparation for the next operation. Under these conditions, it becomes desirable to then cause two lighs to come on, one indicating a flip of the work and the other a turn. This may readily be provided for by duplicating the various light circuits with their included switches so that there will be two switches 35 and 71 associated with each contact of the rotary switch, except the first contact.

Thus, when an operator is to be alerted to the fact that the work must be both flipped and rotated before placing it back into the machine, one of the switches 35 may be tilted to energize the light of one color to indicate a flipping of the work, while the other switch 71 may be tilted to energize the light of the other color which indicates that the work be turned. Both lights will therefore appear lit at the same time.

This circuitry may be simplified somewhat by eliminating one of the added lights such as the amber light and one set of switches 71. The remaining set of switches 71 can then be converted to single pole switches, each adapted to close the circuit through the remaining added white light, it being apparent that with such simplified circuitry, an amber and white light can both be lit simultaneously to indicate both a flip and return.

It will be appreciated, that the present invention may be utilized with any programming system, the only essential being that the light or indicating circuits be coordinated with that portion of the programming system which determines sequence.

Accordingly, while I have illustrated and described my invention in its preferred form and in considerable detail, it will be appreciated that the same is subject to alteration and modification without departing from the underlying principles involved, and I accordingly do not desire to be limited in my protection to the specific details illustrated and described except as may be necessitated by the appended claims.

I claim:

1. For use in combination with a system for programming a press brake or like machines in producing a sequence of operations on work, during which, the work must be flipped or turned in preparation for certain of said operations, means for alerting an operator as to the necessity for flipping or turning the work, and means for coordinating said alerting means with said programming system to function at the proper stages in such sequence of operations to activitate said alerting means.

2. Alerting means in accordance with claim 1, characterized by said alerting means including a plurality of indicating means, one indicating means when energized suggesting the necessity for flipping the work, and another of said engaging means, when energized, suggesting the necessity for turning the work.

3. For use in combination with a system for programming a press brake or like machines in producing a sequence of operations on work, during which, the work must be flipped or turned in preparation for certain of said operations, means for alerting an operator as to the necessity for flipping or turning the work, and means for coordinating said alerting means with said programming system to function at the proper stages in such sequence of operations to activate said alerting means, said alerting means including a plurality of indicating means, one indicating means when energized suggesting the necessity for flipping the work, and another of said indicating means, when energized, suggesting the necessity for turning the work, a plurality of circuits corresponding in number to the number of stages in a programming sequence, each of said circuits including switch means for selectively including one of said indicating means in circuit to the exclusion of the other, and said means for coordinating said alerting means with said programming system including means for energizing said circuits in sequence in accordance with the programming sequence of said programming system.

4. Alerting means in accordance with claim 3, characterized by said alerting means including an alert panel having said indicating means and said switch means mounted thereon.

5. Alerting means in accordance with claim 3, characterized by said means for energizing said circuits in sequence in accordance with the programming sequence of said programming system, including a rotary type switch having a plurality of stationary contacts and a rotary contactor, and a connection from each of said circuits to an exclusive one of said stationary contacts.

6. In combination with a system for programming a press brake or like machine in producing a sequence of operations on work, during which, the work must be turned or flipped in preparation for certain of said operations, means capable of alerting an operator to the necessity for flipping or turning work, and means coordinating said alerting means with said programming system to function at the proper stages in such sequence of operations to alert an operator as to the necessity of flipping or turning the work in preparation for the next operation in a sequence.

7. In combination with a system for programming a press brake or like machine in producing a sequence of operations on work, during which, the work must be turned or flipped in preparation for certain of said operations, means capable of alerting an operator to the necessity for flipping or turning the work, and means coordinating said alerting means with said programming system to function at the proper stages in such sequence of operations to alert an operator as to the necessity of flipping for turning the work in preparation for the next operation in a sequence, said programming system involving a series of contacts to control a sequence of predetermined operations of such machine, said alerting means including a plurality of different indicating means, a separate but corresponding series of contacts, means for selectively pre-establishing a circuit connection from any of said later contacts through a selected one or another of said different indicating means, in accordance with the necessity to flip or turn the work during a programming sequence, and means for closing a circuit through each of said selected indicating means at the appropriate stages in said sequence of operations.

* * * * *

UNITED STATES PATENT OFFICE
CERTIFICATE OF CORRECTION

Patent No. 4,031,731　　　　　　　　Dated June 28, 1977

Inventor(s) Rolland A. Richardson

It is certified that error appears in the above-identified patent and that said Letters Patent are hereby corrected as shown below:

On the Title page, after the Abstract, "7 Claims" should read --4 Claims--.

Column 5, Claims 1 & 2, lines 21-36 and Column 6, Claim 6, lines 18-28 should be deleted.

*Signed and Sealed this*

*Twentieth* Day of *September 1977*

[SEAL]

*Attest:*

RUTH C. MASON　　　　　　　LUTRELLE F. PARKER
*Attesting Officer*　　　*Acting Commissioner of Patents and Trademarks*